April 22, 1924.
W. L. HENDRICKS
1,491,263
POWER TRANSMITTING MECHANISM FOR MOTOR VEHICLES
Filed Dec. 17, 1918  2 Sheets-Sheet 1
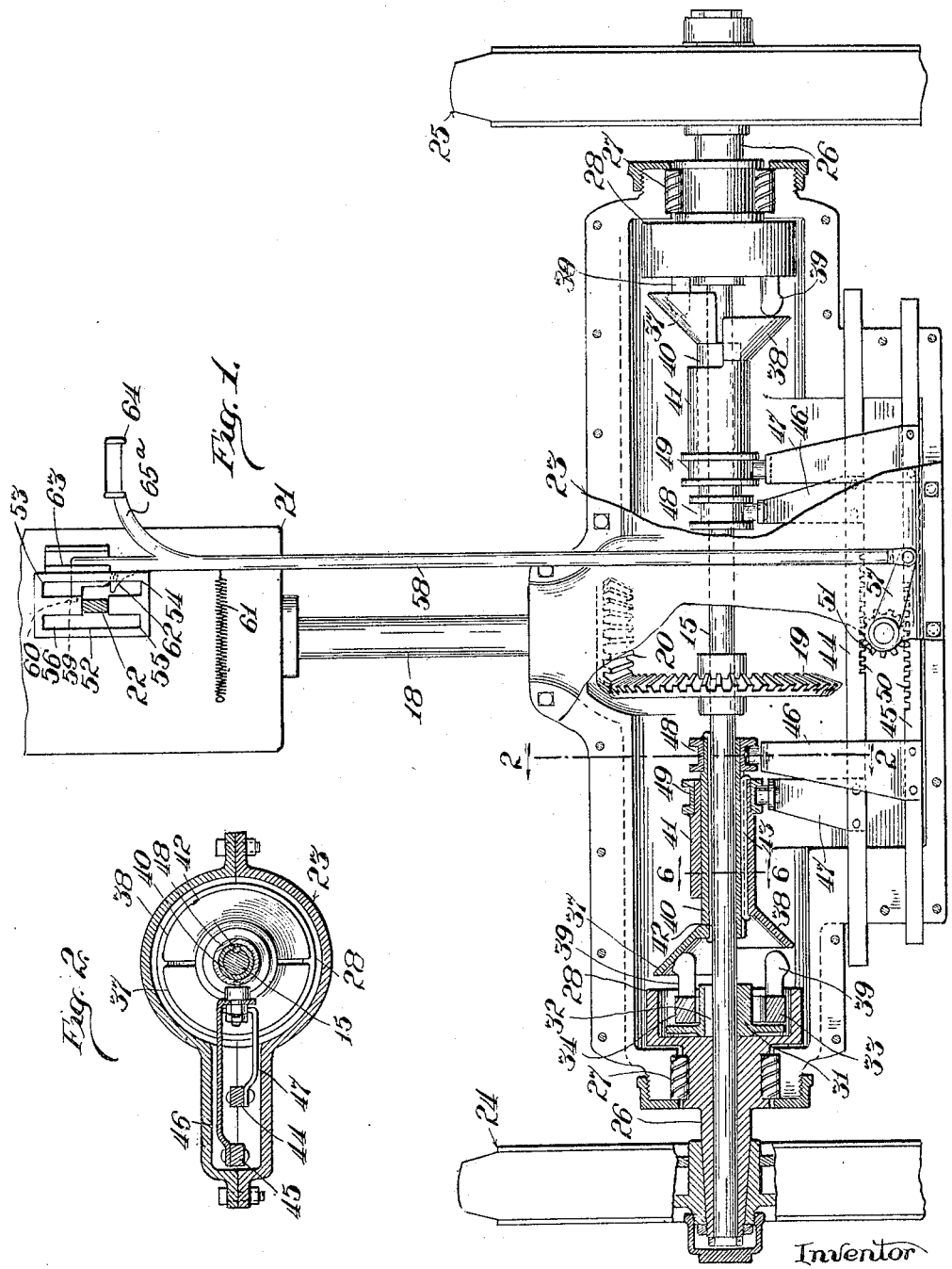

April 22, 1924.                                                                1,491,263
W. L. HENDRICKS
POWER TRANSMITTING MECHANISM FOR MOTOR VEHICLES
Filed Dec. 17, 1918                         2 Sheets-Sheet 2
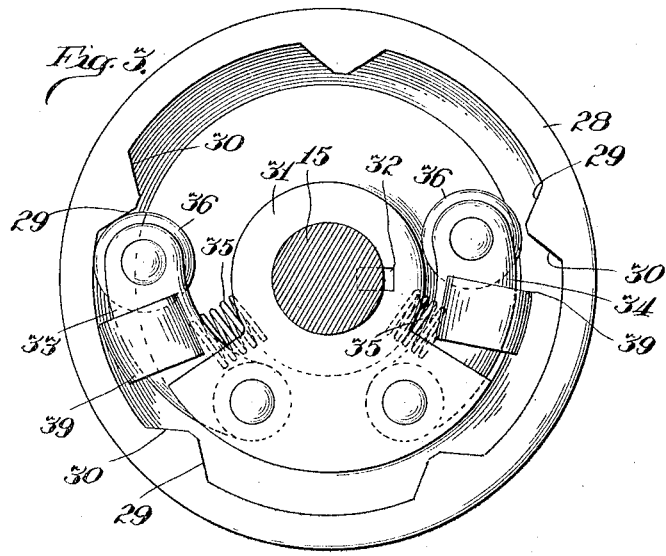
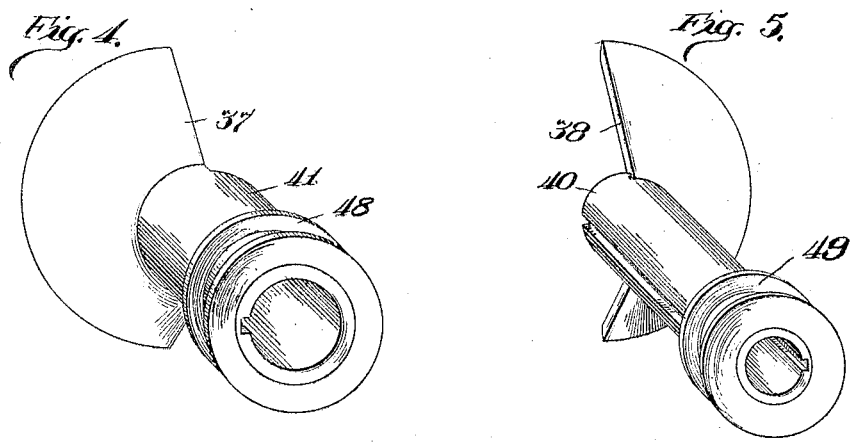
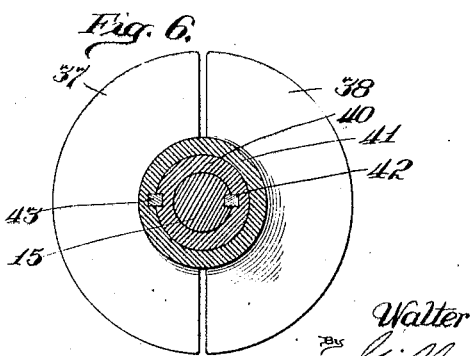
Inventor
Walter L. Hendricks
By Gillson & Gillson
Attorneys.

Patented Apr. 22, 1924.

1,491,263

UNITED STATES PATENT OFFICE.

WALTER L. HENDRICKS, OF AURORA, ILLINOIS.

POWER-TRANSMITTING MECHANISM FOR MOTOR VEHICLES.

Application filed December 17, 1918. Serial No. 267,144.

*To all whom it may concern:*

Be it known that I, WALTER L. HENDRICKS, a citizen of the United States, and resident of Aurora, county of Kane, and State of Illinois, have invented certain new and useful Improvements in Power-Transmitting Mechanism for Motor Vehicles, of which the following is a specification, and which are illustrated in the accompanying drawings, forming a part thereof.

The invention relates to motor vehicles and is especially applicable to tractors and freight carrying trucks although the improvements may also be used upon passenger automobiles if desired. More particularly the invention relates to the mechanism by which power is transmitted from the motor to the wheels at the two sides of the vehicle.

It is well known that when the power of the motor is transmitted to the wheels at the two sides of a vehicle through a differential gear mechanism, as is now the common practice, the motor is inoperative to propel the vehicle if the power driven wheel or wheels at one side become disengaged from the ground or rest upon surfaces which afford only slight frictional resistance to the turning of the wheels. This is particularly objectionable in tractors, as the wheels at one side of the vehicle may frequently travel in loose, freshly plowed soil while the wheels at the other side travel upon hard ground. It is also objectionable in motor trucks when these vehicles are relied upon for transporting heavy loads over uneven roads. The common differential gear mechanism has the further disadvantage in heavy vehicles and those equipped with motors of great power because it requires a division of the driving axle into two parts or sections.

The present invention accordingly has for its object to provide an improved mechanism for motor vehicles which transmits the proper proportion of the power of the motor to each of the driving wheels at all times, regardless of the direction of movement and the manner of engagement of other driving wheels with the ground. In this connection it is of course understood that the improved mechanism permits the wheels at either side of the vehicle to turn in advance of the wheels at the other side, when required, as in rounding a curve or the like.

In the accompanying drawings;—

Fig. 1 is a detail plan view showing the rear axle and propeller shaft of a motor vehicle with the associated mechanism including one embodiment of the invention, some parts being shown in section;

Fig. 2 is a transverse sectional view taken on the line 2—2 of Fig. 1;

Fig. 3 is a detail elevation showing one of the ratchet mechanisms forming part of the construction illustrated in Fig. 1, the rear axle being shown in section;

Figs. 4 and 5 are detail perspective views showing the pawl controlling elements of the mechanism illustrated in Fig. 1;

Fig. 6 is a detail transverse sectional view taken on the line 6—6 of Fig. 1;

In the form of apparatus illustrated in Figs. 1 to 6 inclusive, the mechanism provided by the invention is shown as being applied to a rigid or continuous axle 15, although this form of apparatus is equally applicable to so-called flexible or steering axles.

In Fig. 1, the mechanism for transmitting power to the axle 15 is conventionally represented as comprising a propeller shaft 18 and the beveled gears 19, 20. The propeller shaft 18 extends rearwardly from the usual transmission case 21 and the gear shift lever is shown at 22. As is customary in the construction of motor vehicles of various kinds, a housing 23 covers the axle 15 throughout the greater portion of its length. In this instance the housing 23 is specially constructed to receive and support some of the parts provided by the invention and the beveled gears 19, 20 are also enclosed by this housing.

The rear wheels of the vehicle are represented in Fig. 1 at 24 and 25. Each of these wheels is fixed upon the outer end of a sleeve or bushing 26 and each of the sleeves 26 extends through and is journaled in the corresponding end of the axle housing 23, as at 27. At its inner end, each sleeve 26 is expanded to form a drum 28 having inwardly directed oppositely facing ratchet shoulders 29, 30, (Fig. 3).

A pawl carrying hub 31 is fixed upon the axle 15 within each of the drums 28. As shown, the hubs 31 are keyed to the axle 15, as at 32, (Fig. 3). In order that the axle 15 may be operative to drive the wheels 24, 25, in either direction, each hub 31 is equipped with a pair of oppositely facing pawl arms 33 and 34. The pawl arms 33 and 34 are each pivotally connected with the corresponding hub 31 to swing in a radial plane and a separate stout spring 35 is provided for advancing each of the said pawl arms. Preferably the pawl arms 33, 34, are all equipped with roller pawls, as 36, and these roller pawls cooperate with the corresponding ratchet shoulders 29, 30, of the associated drum 28.

It will be understood that the pawl arms 33, 34, are to be normally advanced in alternation, in accordance with the direction of movement of the vehicle. For this purpose each pawl arm 33, 34, is controlled by a cam 37 or 38, each of which is shown as having the shape of half a cone. For cooperation with the corresponding cams 37, 38, the pawl arms 33, 34, are preferably each formed with a laterally projecting stud 39.

In the form of construction illustrated in Fig. 1, the cams 37 and 38 have axial movement upon the axle 15 and this movement is normally accomplished manually, as by certain operations of the gear shift lever 22. As shown, the cone shaped cams 37, 38, of each set have tubular hubs 40, 41, of different length and different size, the longer hub 40 being the smaller and being mounted directly upon the axle 15, while the shorter hub 41 encloses the hub 40 and slides upon it. In order that each cam 37, 38, will be at all times suitably positioned for engagement with the stud 39 of the corresponding pawl as 33, 34, the hubs 40 and 41 are made to rotate with the axle 15. For this purpose the hub 40 is directly connected with the axle 15 by a key 42 and a key 43 connects the hub 41 with the hub 40.

As the drums 28 and hubs 31 at the two sides of the machine face in opposite directions, it will also be understood that the movements of the pawl arms 33, 34, at each side should alternate with the movements of the pawl arms at the other side. This is conveniently accomplished if the hubs 40 and 41 of the cams 37 and 38 at one side of the machine are operatively connected with the hubs 41 and 40 of the cams 38 and 37, respectively, at the other side of the machine. As shown, two shipper bars 44 and 45 are slidingly mounted in the axle housing 23. These shipper bars are simultaneously moved in opposite directions, and each of them is operatively engaged with the hub 40 of the cam 37 at one side of the machine and with the hub 41 of the cam 38 at the other side of the machine. For this purpose, each of the shipper bars 44 and 45 is equipped with two instanding arms 46, 47, and each of the arms 46 enters an annular groove 48 formed in the hub 40 of one of the cams 37, while each of the arms 47 enters an annular groove 49 formed in the hub 41 of one of the cams 38.

Opposite movements are conveniently accomplished in the shipper bars 44, 45, if gear racks, as 50, are formed along the adjacent edges of the two bars and a pinion 51 is located beyond the bars for engagement with both of the said racks. Preferably the pinion 51 is normally turned by movement of the gear shift lever 22 between its neutral and reverse positions. Under these circumstances the pawl arms 33, 34, occupy one position when the gear shift lever 22 is moved into any of its forward positions and these pawls are reversed whenever the gear shift lever 22 is moved to its reverse position. As shown, the gear shift lever 22 moves in an H slot 52, its reverse position being indicated at 53 while the three forward positions are indicated at 54, 55 and 56.

A crank arm 57 is applied to the pinion 51 and a link 58 is connected at one end with the crank arm 57 while the other end of the link extends over the transmission case 21 adjacent the H slot 52. Preferably the link 58 has both a longitudinal reciprocating movement and a transverse movement at its forward end. Under these circumstances the link 58 is formed with a laterally projecting prong 59 at its forward end and this prong serves both for locking the link 58 against movement in one position by entering a socket 60 in the adjacent wall of the H slot 52 and as an abutment for engagement by the gear shift lever 22. A spring 61 reacting between the link 58 and an adjacent part of the transmission case 21 serves for normally holding the prong 59 in engagement with the socket 60. Movement of the gear shift lever 22 to the right as viewed in Fig. 1, serves to place the forward end of the link 58 to the right for withdrawing the prong 59 from the socket 60. Should the gear shift lever 22 be then thrown forwardly into the reverse position 53, the engagement of the lever 22 with the prong 59 will serve to draw the link 58 forwardly and rotate the pinion 51.

In order that movement of the gear shift lever 22 from its reverse position 53 to its intermediate or neutral position will serve to return the link 58, without the movement of the link 58 being continued by further rearward movement of the gear shift lever 22 to its first forward position, as 54, the link 58 is equipped with a tilting pawl 62 for engagement with the gear shift lever 22. As shown, the tilting pawl 62 is made in the form of a bell crank. During movement of the gear shift lever 22 between its reverse and neutral positions, tilting of the pawl 62 is prevented by engagement of one of its arms with a guide shoulder 63 which may be formed upon an adjacent part of the transmission case 21. As the gear shift lever 22 reaches its neutral position the tilting pawl 62 passes beyond the rear end of the guide shoulder 63 and further movement of the gear shift lever swings the pawl 62 without movement of the link 58.

With the arrangement so far described the driving wheels 24, 25, will turn in advance of the axle 15 whenever the vehicle proceeds forwardly under its own momentum or by gravity, as in traveling down grade, as distinguished from the propelling effort of the motor, not shown. Under these circumstances, the momentum of the vehicle could not be relied upon to keep the motor in motion during a temporary interruption of the power nor could the resistance to movement of the motor be relied upon to retard the down grade movement of the vehicle. Provision is accordingly made for reversing the positions of the pawl arms 33, 34, without movement of the gear shift lever 22. For this purpose the link 58 is desirably moved by a pedal 64. As shown, the pedal 64 is rigidly connected with the link 58 adjacent its forward end through an arm 65ª. In using the pedal 64 for reversing the pawl arms 33, 34, the pedal is first pushed to the right, as viewed in Fig. 1, to disengage the prong 59 from the socket 60. This movement of the pedal is limited by contact of the forward end of the link 58 with the guide shoulder 63. When the prong 59 has been disengaged from the socket 60, the pedal 64 may be moved forwardly to turn the pinion 51. Upon release of the pedal 64 the reverse movement of the parts is accomplished by the spring 61.

I claim as my invention:

1. The combination with the axle of a motor vehicle and means for driving the axle in either direction including a reversing lever, of a ground wheel at each end of the axle, two independent ratchet members, one thereof turning with each of the said ground wheels and each of the said ratchet members having oppositely facing ratchet shoulders, two sets of oppositely facing shiftable pawls driven by the axle, the pawls of each set cooperating in alternation with the ratchet shoulders of one of the said ratchet members, pawl shifting mechanism operable to reverse the pawls of both sets and a connection between the said pawl shifting mechanism and the said reversing lever.

2. The combination with the axle of a motor vehicle and means for driving the axle in either direction including a reversing lever, of a ground wheel at each end of the axle, two independent ratchet members, one thereof turning with each of the said ground wheels and each of the said ratchet members having oppositely facing ratchet shoulders, two sets of oppositely facing shiftable pawls driven by the axle, the pawls of each set cooperating in alternation with the ratchet shoulders of one of the said ratchet members, pawl shifting mechanism operable to reverse the pawls of both sets normally engageable by the said reversing lever and means independent of the said reversing lever for operating the said pawl shifting mechanism.

3. In combination, a wheel, an axle therefor, means for driving the axle in either direction including a reversing lever, a reversible ratchet mechanism operable between the wheel and axle, means for reversing the ratchet mechanism operatively engageable by the said reversing lever, and means for reversing the ratchet mechanism independent of the said reversing lever.

4. The combination, with the axle of a motor vehicle and means for driving the axle in either direction including a gear shift lever operable between forward, neutral and reverse positions, of a ground wheel at each end of the axle, a reversible ratchet mechanism operable between each of the said ground wheels and the axle, and means for reversing the ratchet mechanism operatively engageable by the gear shift lever in its movements between neutral and reverse positions only.

5. The combination with the axle of a motor vehicle and means for driving the axle in either direction, of a ground wheel at each end of the axle, a reversible ratchet mechanism operating between each of the said ground wheels and the axle, a single shift lever operable both to reverse the direction in which the axle is driven and to reverse the said ratchet mechanisms, and means for reversing the said ratchet mechanisms operable independently of the said shift lever.

6. In combination, a wheel, an axle therefor, a ratchet member having oppositely facing ratchet shoulders turning with the wheel, a pair of oppositely facing spring advanced pawls turning with the axle, a pair of cams both reciprocable in directions parallel to the length of the axle and each operable when advanced to depress one of the pawls, a tubular hub for each cam, the two hubs being slidingly mounted on the axle and telescopically engaged one within the other, a pair of oppositely movable shipper bars and a connection between each of the shipper bars and the hub of one of the cams.

7. The combination with a vehicle axle, of a wheel at each end of the axle, a ratchet member having oppositely facing ratchet shoulders turning with each of the wheels, a pair of oppositely facing spring advanced pawls turning with the axle for cooperation with the ratchet shoulders of each of the said ratchet members, a pair of oblique cams associated with each pair of pawls, each cam being operable when advanced to depress one of the associated pawls, a tubular hub for each cam, the hubs of each pair of cams being slidingly mounted on the axle and telescopically engaged one within the other, a pair of oppositely movable shipper bars, and a connection between each of the shipper bars and the outer hub of one pair and the inner hub of the other pair.

8. In combination, a wheel, an axle therefor, a ratchet member having oppositely facing ratchet shoulders turning with one of said parts, a pair of oppositely facing spring advanced pawls turning with the other of said parts, a pair of cams, one associated with each pawl and each adapted when actuated, to depress its pawl, a lever for reversing movement of said axle, and means for reversing the ratchet mechanisms operately engageable by said reversing lever.

WALTER L. HENDRICKS.